(12) United States Patent
Hibbitt et al.

(10) Patent No.: US 9,878,910 B2
(45) Date of Patent: Jan. 30, 2018

(54) TREATMENT OF GASES

(71) Applicant: LINDE AKTIENGESELLSCHAFT, Munich (DE)

(72) Inventors: Ian Hibbitt, Derbyshire (GB); Bernhard Schreiner, Oberhaching (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/909,150

(22) PCT Filed: Aug. 14, 2014

(86) PCT No.: PCT/GB2014/052469
§ 371 (c)(1),
(2) Date: Feb. 1, 2016

(87) PCT Pub. No.: WO2015/022524
PCT Pub. Date: Feb. 19, 2015

(65) Prior Publication Data
US 2016/0167964 A1    Jun. 16, 2016

(30) Foreign Application Priority Data
Aug. 13, 2013 (GB) .................................. 1314450.6

(51) Int. Cl.
*C01B 17/04* (2006.01)
*B01J 12/00* (2006.01)
(Continued)

(52) U.S. Cl.
CPC ...... *C01B 17/0447* (2013.01); *B01D 53/8615* (2013.01); *B01J 19/245* (2013.01);
(Continued)

(58) Field of Classification Search
CPC .. C01B 17/0404; C01B 17/0232; B01J 12/00; B01J 12/007; B01J 2219/24; B01J 2219/00024; B01D 53/8615
See application file for complete search history.

(56) References Cited

U.S. PATENT DOCUMENTS 4,085,199 A     4/1978 Singleton et al.
4,478,811 A *  10/1984 Hass ...................... C01B 17/04
                                                      423/574.1
(Continued)

FOREIGN PATENT DOCUMENTS

CN         104185605 B  * 11/2016 ......... B01D 19/0005

*Primary Examiner* — Timothy C Vanoy
(74) *Attorney, Agent, or Firm* — Philip H. Von Neida

(57) ABSTRACT

A process and apparatus for recovering sulphur from a hydrogen sulphide containing gas stream are disclosed. A gas stream containing hydrogen sulphide gas is passed into an apparatus having a first thermal-reaction-region and a first catalytic region and reacting a portion of the hydrogen sulphide gas to sulphur dioxide and water and reacting a further portion to form sulphur vapor and water vapor to form a resultant-gas-mixture of water vapor, sulphur vapor, sulphur dioxide and hydrogen sulphide and passing a portion to the first catalytic-region whereby at least a portion of the hydrogen sulphide is reacted in the presence of a catalyst to form further sulphur vapor and water vapor and condensing at least a portion of sulphur vapor to form liquid sulphur and passing at least a portion of the liquid sulphur to a sulphur pit.

12 Claims, 2 Drawing Sheets

Figure 1:
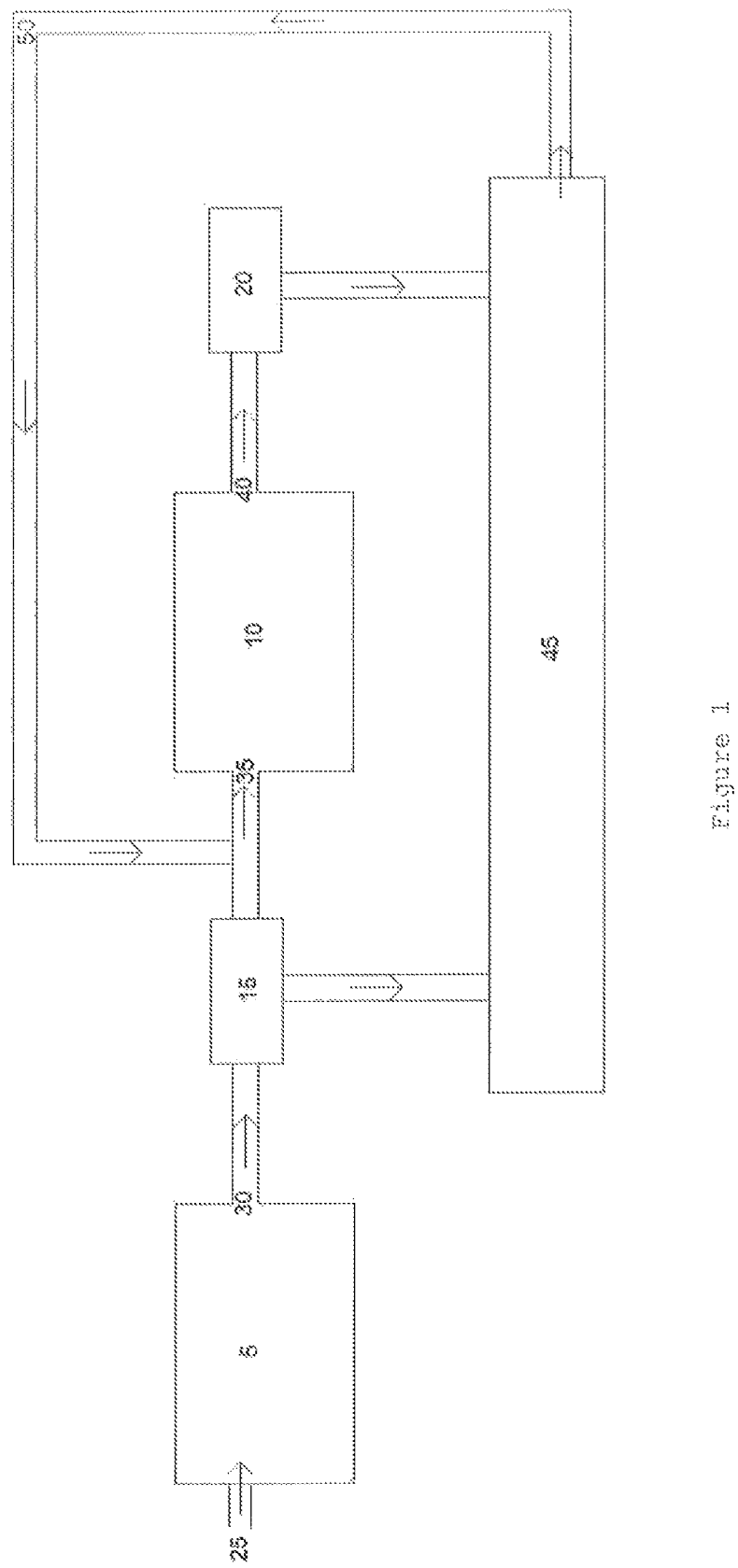

(51) Int. Cl.
*B01D 53/86* (2006.01)
*B01J 19/24* (2006.01)

(52) U.S. Cl.
CPC .. *C01B 17/0456* (2013.01); *B01D 2255/2092* (2013.01); *B01D 2255/20707* (2013.01); *B01J 2219/24* (2013.01); *Y02P 20/129* (2015.11)

(56) References Cited

U.S. PATENT DOCUMENTS

| | | | |
|---|---|---|---|
| 6,776,974 B1 | 8/2004 | Burmaster et al. | |
| 8,440,160 B1 | 5/2013 | Rameshni et al. | |
| 8,679,448 B2* | 3/2014 | Chow | B01D 19/0005 422/168 |
| 8,871,176 B2* | 10/2014 | Liu | C01B 17/05 423/573.1 |
| 9,138,675 B2* | 9/2015 | Keller | B01D 5/0012 |
| 2013/0071315 A1* | 3/2013 | Chow | B01D 19/0005 423/567.1 |

\* cited by examiner

TREATMENT OF GASES

INTRODUCTION

This invention relates to the treatment of gases, in particular, it relates to the treatment of a gas stream comprising hydrogen sulphide and an apparatus for performing such a process.

BACKGROUND

Gas streams comprising hydrogen sulphide are typically produced as waste products or by-products from many industrial processes. For example, acid gas streams comprising mainly hydrogen sulphide are typically produced during oil refinery operations in which sulphur is removed from crude oil. It is necessary to treat such hydrogen sulphide-containing streams before discharging them to the atmosphere so as to reduce or remove altogether their content of sulphur-containing gases. One well known, widely practised process for treating a gas stream comprising hydrogen sulphide is the Claus process. The Claus process is well known and is discussed, for example, in EP 0,237,217.

Sulphur recovery units based on the Claus process produce elemental sulphur from feed gases with a high concentration of $H_2S$ by partial oxidation of the latter using air, oxygen enriched air or pure oxygen as the primary oxidant. The sulphur dioxide produced by this oxidation exothermically reacts with a portion of the remaining $H_2S$ to produce sulphur vapour and water vapour. Cooling of the process gas downstream of the thermal Claus step as well as downstream of each catalytic Claus reactor leads to condensation of the majority of the sulphur vapour carried by the process gas. This allows for separation of the liquid sulphur product from the process gas. The different streams of liquid sulphur are collected in a container/sulphur pit. Sulphur obtained in this way thus contains appreciable amounts (up to 500 wt.-ppm of physically as well as chemically dissolved $H_2S$ which poses a considerable toxic/explosion/fire risk in storage and transportation operations in which $H_2S$ inevitably gases out into the headspace of the container/pit. In order to reduce this risk, a large proportion of the dissolved $H_2S$ is removed from the liquid sulphur as early as possible in the supply chain. Usually, the removal is effected from the sulphur pit(s).

Respective technologies applied according to the state of the art use gases such as air or nitrogen to either sweep the headspace of the containment pit or degas the liquid sulphur by passing the gas through the liquid sulphur. These methods produce an off-gas stream, for example a gaseous stream comprising nitrogen or air and containing components such as $H_2S$, $SO_2$, COS, $CS_2$ and sulphur vapour.

These off-gases (also known as sweep gas or pit gas) are most often sent to the incinerator/stack section of the Claus unit, where all sulphur components are thermally or catalytically oxidised to $SO_2$, thereby contributing to the overall $SO_2$ emission of the sulphur recovery plant. In cases where very high sulphur recovery efficiency of >99.8% is required, the above described $SO_2$ contribution originating from the sulphur pit must be reduced or removed and therefore other methods must be applied.

Such methods include treating the off-gas streams in a caustic scrubber system thereby eliminating most of the sulphur components by incorporating them into the liquid phase in the form of, for example, sulphides, sulphites, thiosulphates, sulphate and elemental solid sulphur. Alternatively, more recently, rather than treating the off-gas in a caustic scrubber system, the off-gas may be recycled upstream of the thermal stage of the Claus unit, thereby avoiding the need to use chemicals such as aqueous NaOH and/or salts which generate $S_2^-$ or $HS^-$ ions in the aqueous liquid phase. However, in order to recycle the off-gas (which has not been degassed at an elevated pressure), it must be pressurised, for example by means of a steam ejector, to a considerable degree: i.e. from almost atmospheric pressure up to greater than the pressure of the process gas (which is typically around 1.5 bar (0.15 MPa). In addition, if sufficient precautions are not taken, sulphur vapour from the off-gas will condense and even solidify in the burner internal components within the thermal reaction region which can be highly detrimental and jeopardise reliable long-term operation. This recycling of the off-gas to the section upstream of the thermal Claus stage ensures that the potentially $O_2$-containing off-gas is depleted of all molecular oxygen by the time it exits the first thermal-reaction-region. This is important in the prior art methods because molecular oxygen must not be allowed to contact the commonly used $Al_2O_3$-based Claus catalyst.

There, therefore, a desire to provide an improved gas treatment process and/or apparatus which mitigates at least some of the problems associated with the prior art.

It is an aim of the present invention to provide an improved process and apparatus for recovering sulphur from a gas stream comprising hydrogen sulphide.

In particular, the present inventors have found that the process can be improved by recycling the off-gas downstream of the first thermal-reaction-region and upstream of one of the catalytic converters into the process gas pipe.

STATEMENT OF THE INVENTION

In a first aspect, the present invention provides a process for recovering sulphur from a hydrogen sulphide containing gas stream, the process comprising:
  (i) providing a gas stream comprising hydrogen sulphide gas;
  (ii) passing the gas stream into an apparatus comprising a first thermal-reaction-region and a first catalytic-region; and
    (1) reacting a portion of the hydrogen sulphide gas in the first thermal-reaction-region to form sulphur dioxide and water vapour and reacting a further portion of the hydrogen sulphide to form sulphur vapour and water vapour, to form a resultant-gas-mixture comprising water vapour, sulphur vapour, sulphur dioxide, and hydrogen sulphide; and
    (2) passing at least a portion of the resultant-gas-mixture to the first catalytic-region, whereby at least a portion of the hydrogen sulphide is reacted, in the presence of a catalyst, to form further sulphur vapour and water vapour; and
  after step (1) and/or step (2), condensing at least a portion of said sulphur vapour to form liquid sulphur and passing at least a portion of the liquid sulphur to a sulphur pit; wherein
  an off-gas formed or contained in the sulphur pit is recycled from the sulphur pit into the process downstream of the first thermal-reaction-region.

In a second aspect, the present invention provides an apparatus for recovering sulphur from a hydrogen-sulphide-containing gas, the apparatus comprising:
  a first thermal-reaction-region having an inlet for a gas-stream comprising hydrogen sulphide gas, means to react hydrogen sulfide in said gas stream to produce first reaction gases, and an outlet for the first reaction gases, a first catalytic-region having an inlet for the first reaction gases in fluid communication with the outlet of the first thermal-reaction-region and optionally a catalyst for reacting hydrogen sulphide to form second reaction gases comprising sulphur vapour and water vapour, and an outlet for the second reaction gases, optionally a sulphur condenser arranged to receive the first reaction gases passing from the outlet of the first thermal-reaction-region to the inlet of the first catalytic-region and to form liquid sulphur, optionally a sulphur condenser arranged to receive the second reaction gases passing from the outlet of the first catalytic-region and to form liquid sulphur, a sulphur pit for retaining liquid sulphur, means for transferring at least a portion of the liquid sulphur from the first and/or second sulphur condensers to the sulphur pit; and means for recycling gases from the sulphur pit into the apparatus downstream of the first thermal-reaction-region, wherein the apparatus comprises at least one sulphur condenser.

DETAILED DISCLOSURE OF THE INVENTION

The present invention will now be further described. In the following passages different aspects/embodiments of the invention are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Unless otherwise stated, all percentages are by volume.

As used herein, the term "thermal-reaction-region" refers to a region which comprises a "combustion zone", in which a portion of hydrogen sulphide can be oxidized to form sulphur dioxide, and a "reaction furnace" associated with the combustion zone, in which a portion of hydrogen sulphide can be reacted with sulphur dioxide to form sulphur vapour and water vapour. The combustion zone may comprise a "burner".

A thermal-reaction-region preferably has heat exchange means such as a waste heat boiler associated therewith for reducing the temperature of the gas mixture downstream of the reaction furnace. The waste heat boiler is optionally a multi-pass waste heat boiler.

A "catalytic-region" refers to a region comprising a "catalytic reactor" in which hydrogen sulphide can be catalytically reacted with sulphur dioxide to form further sulphur vapour and water vapour.

Suitable thermal-reaction-regions, combustion zones, burners, reaction furnaces, waste heat boilers and catalytic reactors are well known to the skilled person in the art.

A "sweep gas" refers to gases such as air and/or air diluted with nitrogen, with an oxygen content of less than 20%, preferably with an oxygen content of less than 15%, or nitrogen which can be used to sweep the headspace of the containment/sulphur pit to form an "off-gas" stream.

An "off-gas stream" is a gaseous stream, originating from the sulphur containment/sulphur pit, optionally comprising a sweep gas, $H_2S$ and/or $SO_2$ and optionally COS and/or $CS_2$ and/or sulphur vapour. Preferably the off-gas comprises $H_2S$ and/or $SO_2$. More preferably the off-gas comprises a sweep gas, $H_2S$ and $SO_2$. Most preferably the off-gas comprises a sweep gas and $H_2S$.

The process of the present invention is directed to the recovery of sulphur species from a hydrogen sulphide containing gas stream. The process may be carried out either onshore, or offshore. Typically the gas stream will comprise hydrocarbons, carbon dioxide and hydrogen sulphide. However, it will be understood that other gases may be present. The process of the present invention is preferably performed on gas sources comprising from 10 to 99.9% by volume of hydrogen sulphide, more preferably from 30 to 98% and most preferably from 40 to 95%, or from 45 to 90% by volume of hydrogen sulphide based on the total volume of gas.

The process removes at least a portion of, and preferably almost all of, the hydrogen sulphide from the gas stream. That is, the process preferably removes at least 96% by volume of the hydrogen sulphide, more preferably 98%, even more preferably 99% and most preferably 99.5%. Furthermore, by recycling the off-gas comprising hydrogen sulphide downstream of the first thermal-reaction-region, the process preferably removes at least 99.6% by volume of the hydrogen sulphide, more preferably 99.7%, even more preferably 99.8% and most preferably at least 99.9% by volume of the hydrogen sulphide in the initial hydrogen sulphide containing gas stream.

The process of the present invention is suitable for the removal of hydrogen sulphide from any hydrogen sulphide containing gas stream, such as natural gas derived streams and hydrogen sulphide containing carbon dioxide gas streams. However, one skilled in the art would appreciate that the process can be applied to other hydrogen sulphide containing gas streams.

Natural gas is a gaseous fossil fuel typically primarily comprising flammable hydrocarbons. A flammable hydrocarbon is one that burns readily on ignition in the presence of oxygen. The hydrocarbons include methane, ethane, propane, butane, alkanes, alkenes and aromatic compounds such as benzene, toluene and xylenes. Ignoring hydrogen sulphide impurities, natural gas preferably comprises at least 50% methane, more preferably 75% and most preferably 90%. Natural gas can include up to 10% of each of ethane, propane, butane, and pentane. It can also contain some small amounts (less than 2%) of volatile heavier hydrocarbons, although these are removed from the gas prior to sale. Natural gas is commonly found with impurities including carbon dioxide, nitrogen, helium and hydrogen sulphide. It is found in oil wells, gas wells, condensate wells and in coal beds.

The process of the present invention comprises a number of steps.

Step (i) involves providing a hydrogen sulphide containing gas stream. Such a gas stream can be obtained from, for example, a hydrogen sulphide scrubber. Preferably the gas stream is at a pressure of 0.15 MPa and has an ambient temperature or higher. This step may involve obtaining, drilling for, storing and/or preparing the gas stream comprising hydrogen sulphide, and directing the gas into the apparatus for performing the process. The gas is passed as a stream through the apparatus. Preferably, the gas is treated in a continuous process, rather than as a batch process.

Step (ii) involves passing the gas stream into an apparatus comprising a first thermal-reaction-region and a first catalytic-region and (1) reacting a portion of the hydrogen sulphide gas in the first thermal-reaction-region to form sulphur dioxide and water vapour and reacting a further portion of the hydrogen sulphide to form sulphur vapour and water vapour, to form a resultant-gas-mixture comprising water vapour, sulphur vapour, sulphur dioxide, and hydrogen sulphide. Preferably this step involves some turbulent flow of the gases to encourage thorough mixing.

Preferably, the reaction conditions in the first thermal-reaction-region are: a temperature of from 950 to 1450° C. and a pressure of at least 0.15 MPa.

Suitable reaction conditions for the Claus reaction are described in EP 0,237,217.

Step (ii) (2) involves passing at least a portion of the resultant-gas-mixture (comprising water, vapour, sulphur vapour, sulphur dioxide, and hydrogen sulphide) to the first catalytic-region, whereby at least a portion of the hydrogen sulphide is reacted, in the presence of a catalyst, to form further sulphur vapour and water vapour.

After step (ii) (1) and/or step (2), at least a portion of said sulphur vapour is condensed to form liquid sulphur and at least a portion of the liquid sulphur is passed to a sulphur pit. Subsequently, an off-gas formed or contained in the sulphur pit is recycled from the sulphur pit into the process downstream of the first thermal-reaction-region.

Recycling (i.e. removing) the off-gas from the sulphur pit is advantageous as it improves the safety of the process because the off-gas would otherwise pose a considerable explosion/fire risk in storage and transportation operations of the sulphur product. Moreover, recycling an off-gas rather than simply removing it from the sulphur pit and oxidising it is advantageous because it increases the sulphur recover efficiency of the process and reduces emissions of harmful gases such as $SO_2$ into the environment. Furthermore, recycling the off-gas rather than treating it separately in a separate caustic scrubber system avoids the need to use chemicals such as aqueous NaOH and/or salts which generate $S_2$— or HS— ions in the aqueous liquid phase. In particular, recycling the off-gas into the process downstream of the first thermal-reaction-region is advantageous because the off-gas does not have to be pressurised to at least the same pressure of the process gas (which is typically around 1.5 bar (0.15 MPa). Indeed the necessary pressurisation of the off-gas is only marginal (preferably the necessary pressure is from 0.1 bar (0.01 MPa) to 0.5 bar (0.05 MPa), more preferably from 0.1 bar (0.01 MPa) to 0.4 bar (0.04 MPa), most preferably less than 0.4 bar (0.04 MPa) or less than 0.3 bar (0.03 MPa)) and therefore the pressurisation is much easier to accomplish and the process requires less energy input. Recycling the off-gas into the process downstream of the first thermal-reaction-zone is further advantageous because heating precautions for avoidance of sulphur condensation/solidification are much easier to take as it is only any interconnecting piping which has to be heated and not more delicate apparatus such as the first thermal-reaction-region, the combustion zone and/or the burner. Thus reliable long-term operation is not jeopardised.

The apparatus for recovering sulphur from a hydrogen-sulphide-containing gas preferably comprises:
  a first thermal-reaction-region having an inlet for a gas stream comprising hydrogen sulphide gas, means to react hydrogen sulphide in said gas stream to produce first reaction gases, and an outlet for the first reaction gases,
  a first catalytic-region having an inlet for the first reaction gases in fluid communication with the outlet of the first thermal-reaction-region and optionally a catalyst for reacting hydrogen sulphide to harm second reaction gases comprising sulphur vapour and water vapour, and an outlet for the second reaction gases,
  optionally a sulphur condenser arranged to receive the first reaction gases passing from the outlet of the first thermal-reaction-region to the inlet of the first catalytic-region and to form liquid sulphur,
  optionally a sulphur condenser arranged to receive the second reaction gases passing from the outlet of the first catalytic-region and to form liquid sulphur,
  a sulphur pit for retaining liquid sulphur,
  means for transferring at least a portion of the liquid sulphur from the first and/or second sulphur condensers to the sulphur pit; and
  means for recycling gases from the sulphur pit into the apparatus downstream of the first thermal-reaction-region,
  wherein the apparatus comprises at least one sulphur condenser.

It is understood that the "first reaction gases" refer to the gases that exit the first thermal-reaction-region and comprise hydrogen sulphide, sulphur dioxide, water vapour and sulphur vapour. However, it is understood that further gases may be present.

It is understood that the "second reaction gases" refer to gases that exit the first catalytic-region and comprise sulphur vapour and water vapour. However, it is understood that further gases may be present, for example unreacted hydrogen sulphide and sulphur dioxide.

Providing an apparatus with a means for recycling gases from the sulphur pit into the apparatus downstream of the first thermal-reaction-region is advantageous for the reasons discussed above with respect to the recycling of the off-gas into the process downstream of the first thermal-reaction-region.

Preferably the catalyst present in the first catalytic-region is an oxygen tolerant catalyst. More preferably the catalyst is an oxygen tolerant Claus catalyst such as $TiO_2$. The use of such a catalyst is advantageous over non-oxygen tolerant catalysts such as alumina ($Al_2O_3$) alone because such oxygen tolerant catalysts are oxygen resistant and are less prone to sulphate build-up, thereby being less prone to fast deactivation. Most preferably the catalyst comprises $TiO_2$. This is because, particularly when applied in the first catalytic Claus stage, a catalyst comprising $TiO_2$ is highly active and optimises hydrolysis of COS and $CS_2$, thereby favouring an enhanced sulphur recovery efficiency.

Alternatively and/or preferably, the catalyst comprises $Al_2O_3$ and provided that the first catalytic-region also comprises an oxygen scavenger material, preferably a top layer of a suitable oxygen scavenging material. Preferably the oxygen scavenger material comprises iron. For example, preferably, the first catalytic-region comprises a top layer of an iron based material on $Al_2O_3$. More preferably, the oxygen scavenger material is arranged as a layer in the inlet for the first reaction gases (i.e. the gases from the first or further thermal-reaction-regions) in the first catalytic-region. Such a material and/or configuration thereof advantageously prevents oxygen from deactivating the catalyst and prevents sulphate build up.

Preferably the off-gas comprises at least 0.001%, more preferably 0.01% or 0.1%, most preferably at least 1% by volume of hydrogen sulphide based on the total volume of the off-gas.

Preferably the off-gas comprises less than 5%, more preferably less than 4% or 3% or 2%, most preferably less than 1% by volume of sulphur dioxide based on the total volume of the off-gas.

In one embodiment, at least a portion of the off-gas is recycled from the sulphur pit to the first catalytic-region.

Alternatively, at least a portion of the off-gas is recycled from the sulphur pit to one or more further catalytic-regions downstream of the first catalytic-region. Preferably there are one, two or three further catalytic-regions. Most preferably there are two further catalytic-regions. Components such as hydrogen sulphide and sulphur dioxide which would otherwise have been discarded can thus be advantageously catalytically reacted to form the desirable sulphur product.

In one highly preferable embodiment, at least a portion of the off-gas is recycled from the sulphur pit to one or more further thermal-reaction-regions downstream of the first thermal-reaction-region. Preferably there are one, two or three further thermal-reaction-regions. Most preferably there is one further thermal-reaction-region. As the off-gas is recycled from the sulphur pit to one or more further thermal-reaction-regions downstream of the first thermal-reaction-region, the off-gas from the sulphur pit is not recycled to the first thermal-reaction-region. Advantages of recycling the off-gas into the one or more, preferably one, further thermal-reaction-regions downstream of the first thermal-reaction-region are that whilst still advantageously recycling the potentially hazardous off-gas, thereby increasing the overall efficiency and/or yield and/or safety of the overall process:
1) no diluent gases are introduced into the first thermal-reaction-region, thus enabling the correct temperature to be maintained in the first thermal-reaction-region;
2) the off-gas stream will have no or minimal detrimental effect on the overall performance of the first thermal-reaction-region and the one or more further thermal-reaction-regions compared to a situation in which off-gas is recycled into the first thermal-reaction-region; and
3) oxygen contained in the off-gas stream will contribute to the plant performance allowing the air blowers in the one or more further thermal-reaction-regions to run at lower load.

It is understood that the distribution of off-gas nozzles/inlets into the one or more further thermal-reaction-regions will be dependent on the size and shape of the one or more further thermal-reaction-regions and the flow direction out of the one or more further thermal-reaction-regions, for example the flow direction to a waste heat boiler.

Preferably the process comprises recycling at least a portion of the off-gas to a second thermal-reaction-region downstream of the first thermal-reaction-region; wherein the first thermal-reaction-region is housed in a first single unit together with a first waste heat boiler and wherein the second thermal-reaction-region is housed in a second single unit together with a second waste heat boiler; wherein the gas stream of step (i) is passed through the first thermal-reaction-region, through the first waste heat boiler to the second thermal-reaction-region where it is combined with at least a portion of the recycled off-gas, then said combined stream is passed through the second waste heat boiler. The advantages of such a system comprising first and second thermal-reaction-regions are discussed in detail in EP 0,237, 217.

Preferably the process comprises recycling at least a portion of the off-gas to a second thermal-reaction-region downstream of the first thermal-reaction-region; wherein the first and second thermal-reaction-regions are housed in a single unit together with a multi-pass waste heat boiler; wherein the gas stream of step (i) is passed through the first thermal-reaction-region, through the multi-pass waste heat boiler to the second thermal-reaction-region where it is combined with at least a portion of the recycled off-gas, then said combined stream is passed through the multi-pass waste heat boiler. Use of a single unit housing the first and second thermal-reaction regions together with a multi-pass waste heat boiler is advantageous because the single unit (comprising only one (multi-pass) waste heat boiler) is more compact and therefore suitable for processing plants with restricted plot space. Furthermore, the use of such a multi-pass waste heat boiler improves energy efficiency through the generation of valuable high-pressure steam. Other advantages include a reduced process gas flow through the process plant, reducing converter reheat and incinerator fuel gas requirements. This leads to a significant reduction in carbon dioxide emissions.

Preferably the process comprises introducing sweep gas into the sulphur pit to form off-gas. Preferably, the sweep gas is nitrogen and/or air.

Preferably the process comprises degassing the liquid sulphur in the sulphur pit to form off-gas. Preferably the liquid sulphur is degassed at a pressure of from 0.5 to 1 MPa. More preferably the liquid sulphur is degassed at a pressure of from 0.6 to 0.9 MPa, or 0.7 to 0.8 MPa.

Advantageously, at such pressures, a compressor is not required, thus reducing the power and economic requirements of the process whilst removing the recyclable hazardous off-gas from the sulphur product.

Preferably the process further comprises combining the off-gas with a gas stream comprising $O_2$ before the off-gas is recycled into the process downstream of the first thermal-reaction-region. This is advantageous because this allows for significant swirling/mixing of the gases before entry into the process to prevent free/molecular oxygen from entering the waste heat boiler. This is because, under such conditions in the waste heat boiler, free (unreacted) oxygen is converted to hazardous sulphur trioxide, which would rapidly destroy the tubes in the waste heat boiler.

Preferably the apparatus comprises a means for recycling gases from the sulphur pit to the first catalytic region. Alternatively and/or preferably, the apparatus comprises one or more further catalytic regions downstream of the first catalytic region.

Preferably the apparatus comprises one or more further thermal-reaction-regions downstream of the first thermal-reaction-region. More preferably the apparatus comprises a means for recycling gases from the sulphur pit to the one or more further thermal-reaction-regions downstream of the first thermal-reaction-region.

FIGURES

The present invention will now be described further with reference to the accompanying drawings provided by way of example, in which:

FIG. 1 shows a flow diagram of the process for recovering sulphur from a hydrogen sulphide containing gas stream and an apparatus of one embodiment of the present invention. The arrows represent the direction of the gas flow.

KEY FOR FIG. 1

Figure 2:
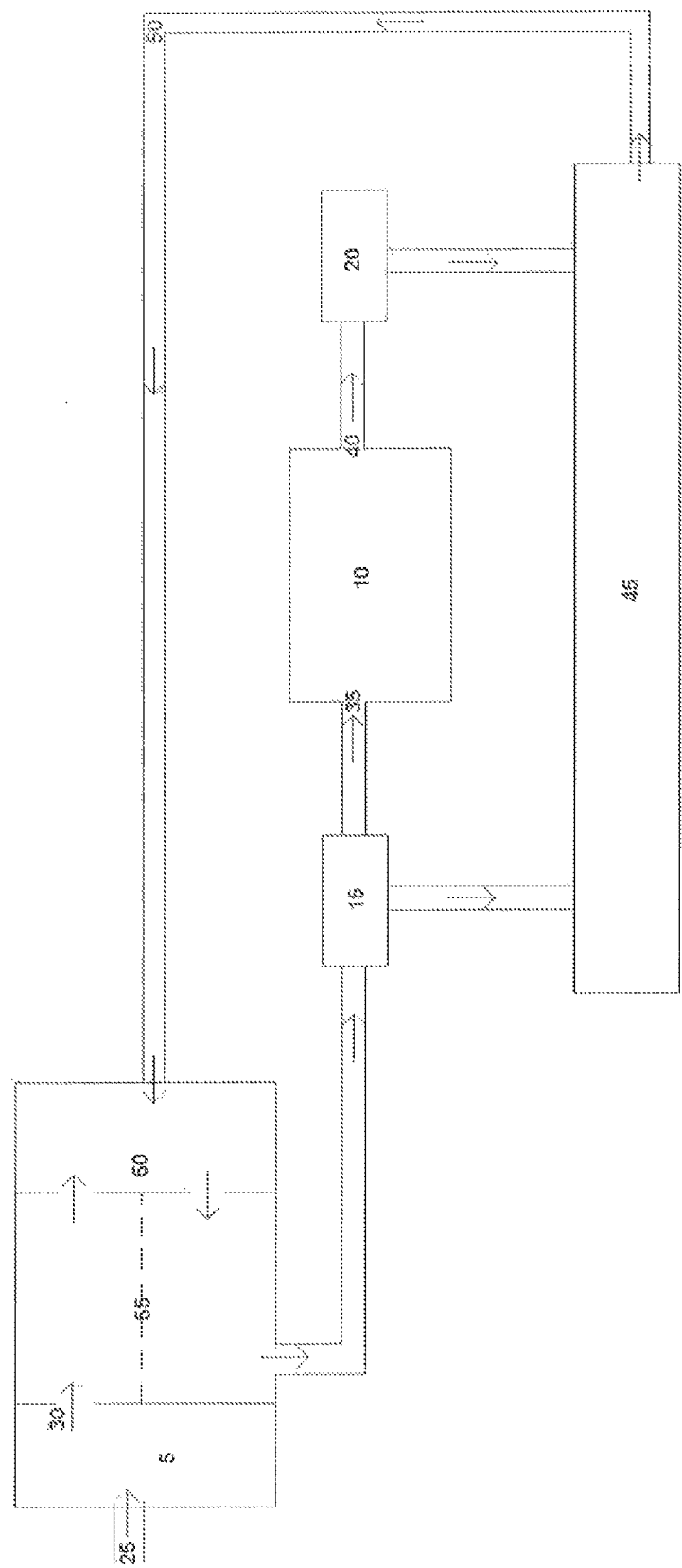

5. First thermal-reaction-region
10. First catalytic-region
15. Sulphur condenser
20. Sulphur condenser
25. Inlet for a gas stream comprising hydrogen sulphide gas
30. Outlet for the first reaction gases
35. Inlet for the first reaction gases
40. Outlet for the second reaction gases
45. Sulphur pit 50. Means for recycling gases from the sulphur pit into the apparatus downstream of the first thermal-reaction-region FIG. 2 shows a flow diagram for an alternative embodiment of the present invention wherein the process comprises recycling at least a portion of the off-gas to a second thermal-reaction-region downstream of the first thermal-reaction-region; wherein the first and second thermal-reaction-regions are housed in a single unit together with a multi-pass waste heat boiler; wherein the gas stream of step (i) is passed through the first thermal-reaction-region, through the multi-pass waste heat boiler to the second thermal-reaction-region comprising at least a portion of the recycled off-gas, then passed again with at least a portion of the recycled off-gas through the multi-pass waste heat boiler. The arrows represent the direction of the gas flow.

KEY FOR FIG. 2

5. First thermal-reaction-region
10. First catalytic-region
15. Sulphur condenser
20. Sulphur condenser
25. Inlet for a gas stream comprising hydrogen sulphide gas
30. Outlet for the first reaction gases
35. Inlet for the first reaction gases
40. Outlet for the second reaction gases
45. Sulphur pit
50. Means for recycling gases from the sulphur pit into the apparatus downstream of the first thermal-reaction-region
55. Multi-pass waste heat boiler
60. Second thermal-reaction-region The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A process for recovering sulphur from a hydrogen sulphide containing gas stream, the process comprising: (i) providing a gas stream comprising hydrogen sulphide gas; (ii) passing, the gas stream into an apparatus comprising a first thermal-reaction-region and a first catalytic region comprising an oxygen scavenger material comprising iron; and (1) reacting a portion of the hydrogen sulphide gas in the first thermal-reaction-region to form sulphur dioxide and water vapour and reacting a further portion of the hydrogen sulphide to form sulphur vapour and water vapour, to form a resultant-gas-mixture comprising water vapour, sulphur vapour, sulphur dioxide, and hydrogen sulphide; and (2) passing at least a portion of the resultant-gas-mixture to the first catalytic-region, whereby at least a portion of the hydrogen sulphide is reacted, in the presence of a catalyst selected from the group consisting of an oxygen tolerant catalyst selected from the group consisting of $TiO_2$ and $Al_2O_3$, to form further sulphur vapour and water vapour; and after step (1), step (2), or both step (1) and step (2) condensing at least a portion of said sulphur vapour to form liquid sulphur and passing at least a portion of the liquid sulphur to a sulphur pit; wherein an off-gas formed or contained in the sulphur pit by degassing the liquid sulphur in the sulphur pit at a pressure of from 0.5 to 1 MPa and further comprising combining the off-gas with a gas stream comprising $O_2$ before the off-gas is recycled from the sulphur pit into the process downstream of the first thermal-reaction-region and at least a portion of the off-gas is recycled from the sulphur pit to the first catalytic region or zone or more further thermal-reaction-regions downstream of the first thermal-reaction-region and further comprising recycling at least a portion of the off-gas to a second thermal-reaction-region downstream of the first thermal-reaction-region; wherein the first thermal-reaction-region is housed in a first single unit together with a first waste heat boiler and wherein the second thermal-reaction-region is housed in a second single unit together with a second waste heat boiler, wherein the gas stream of step (i) is passed through the first thermal-reaction-region, through the first waste heat boiler to the second thermal-reaction-region where it is combined with at least a portion of the recycled off-gas then said combined stream is passed through the second waste heat boiler, or wherein the first and second thermal-reaction-regions are housed in a single unit together with a multi-pass waste heat boiler; wherein the gas stream of step (1) is passed through the first thermal-reaction-region, through the multi-pass waste heat boiler to the second thermal-reaction-region where it is combined with at least a portion of the recycled off-gas, then said combined stream is passed through the multi-pass waste heat boiler.

2. The process according to claim 1 wherein the off-gas comprises at least 0.001% by volume of hydrogen sulphide based on the total volume of the off-gas.

3. The process according to claim 1 wherein the off-gas comprises less than 1% by volume of sulphur dioxide based on the total volume of the off-gas.

4. The process according to claim 1 wherein at least a portion of the off-gas is recycled from the sulphur pit to one or more further catalytic-regions downstream of the first catalytic-region.

5. The process according to claim 1 wherein the off-gas from the sulphur pit is not recycled to the first thermal-reaction-region.

6. The process according to claim 1 comprising introducing sweep gas into the sulphur pit to form off gas.

7. An apparatus for recovering sulphur from a hydrogen-sulphide-containing gas, the apparatus comprising: a first thermal-reaction-region having an inlet for a gas stream comprising hydrogen sulphide gas, means to react hydrogen sulphide in said gas stream to produce first reaction gases, and an outlet for the first reaction gases, a first catalytic-region having an inlet for the first reaction gases in fluid communication with the outlet of the first thermal-reaction-region, a sulphur pit for retaining liquid sulphur, and means for recycling gases from the sulphur pit into the apparatus downstream of the first thermal-reaction-region, wherein the apparatus includes at least one sulphur condenser and means for recycling oases from the sulphur pit to the first catalytic region and further comprises one or more further thermal-reaction-regions downstream of the first thermal-reaction-region, and means for recycling gases from the sulphur pit to the one or more further thermal-reaction-regions downstream of the first thermal-reaction-region.

8. The apparatus according to claim 7 wherein the apparatus comprises one or more further catalytic regions downstream of the first catalytic region.

9. The apparatus according to claim 7 further comprising: a catalyst for reacting hydrogen sulphide to form second reaction gases comprising sulphur vapour and water vapour, and an outlet for the second reaction gases.

10. The apparatus according to claim 7 further comprising: a first sulphur condenser arranged to receive the first reaction gases passing from the outlet of the first thermal-reaction-region to the inlet of the first catalytic region and to form liquid sulphur.

11. The apparatus according to claim 7 further comprising: a second sulphur condenser arranged to receive the second reaction gases passing from the outlet of the first catalytic-region and to form liquid sulphur.

12. The apparatus according to claim 7 further comprising: a first sulphur condenser arranged to receive the first reaction gases passing from the outlet of the first thermal-reaction-region to the inlet of the first catalytic-region and to form liquid sulphur, a second sulphur condenser arranged to receive the second reaction gases passing from the outlet of the first catalytic-region and to form liquid sulphur, and means for transferring at least a portion of the liquid sulphur from the first sulphur condenser, the second sulphur condenser or both the first and second sulphur condenser to the sulphur pit.

* * * * *